United States Patent

[11] 3,588,010

| [72] | Inventor | Gerhard Liesegang<br>Hamburg, Germany |
| --- | --- | --- |
| [21] | Appl. No. | 868,821 |
| [22] | Filed | Oct. 23, 1969 |
| [45] | Patented | June 28, 1971 |
| [73] | Assignee | LISEGA Rohrleitungszubehor G.m.b.H.<br>Hamburg, Germany |
| [32] | Priority | Nov. 2, 1968 |
| [33] | | Germany |
| [31] | | G6804986 |

[54] SPRUNG PIPE SUPPORT
9 Claims, 4 Drawing Figs.

[52] U.S. Cl. .................................. 248/54,
267/166, 267/177
[51] Int. Cl. ..................................... F16l 3/16
[50] Field of Search ............................ 248/54, 54
(C); 267/166, 170, 172, 177

[56] References Cited
UNITED STATES PATENTS
| 1,612,163 | 12/1926 | Todd | 248/54X |
| --- | --- | --- | --- |
| 2,391,467 | 12/1945 | Loepsinger | 248/54X |
| 2,949,270 | 8/1960 | Wood | 248/54 |
| 2,939,663 | 6/1960 | Suozzo | 248/54 |
| 2,873,078 | 2/1959 | Suozzo | 248/54 |

*Primary Examiner*—Chancellor E. Harris
*Attorney*—Waters, Roditi, Schwartz & Nissen

ABSTRACT: A sprung pipe support comprises a drawbar carrying the pipe weight and engaging a vertical pressure spring and connected to two transverse pressure springs which are pivotable about horizontal axes, the transverse springs being connected to the drawbar at a joint located above the vertical spring which is mounted between a fixed thrust block on the drawbar and a displaceable thrust block which is adjustably connected to the casing by screws. The drawbar includes an adapter sleeve coupled to the joint and a lower part threaded in the sleeve and accessible externally of the casing, the joint carrying a bolt extending through a slot in the casing along which a scale is provided.

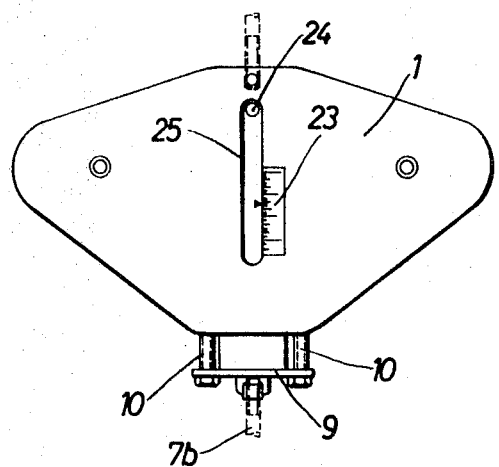
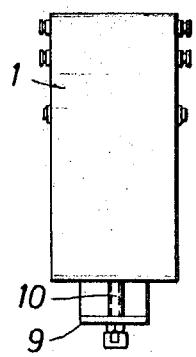
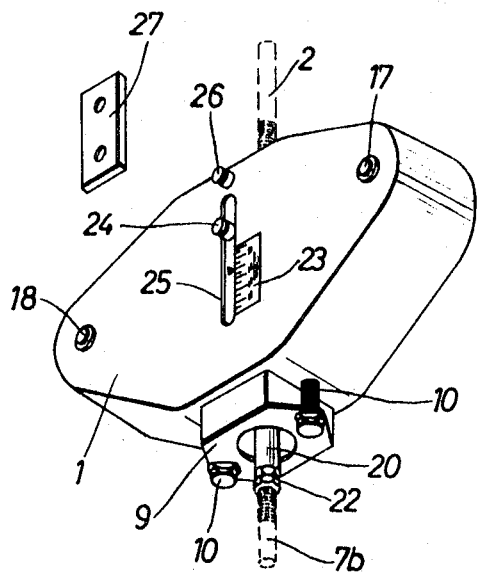

SPRUNG PIPE SUPPORT

BRIEF SUMMARY OF THE INVENTION

The invention relates to a sprung pipe support with a supporting force which remains more or less constant during vertical movement of the pipe load.

If a known sprung pipe support of the above type, a drawbar carrying the pipe engages a vertically arranged pressure spring, and the drawbar is also connected to pressure springs extending transversely with respect to the load direction. These pressure springs are pivotably supported with respect to the horizontal, and the engagement point of the transverse pressure springs on the drawbar is adjustable In this case all three springs have the same dimensions. Both lateral springs engage the drawbar via a joint thereon; the joint can be fixed on the drawbar by means of clamp screws or the like.

In such a sprung pipe support, a setting from zero to the predetermined weight can be undertaken. By this means the adjustability of the engagement point of the lateral springs on the drawbar, and because of the equality of the three springs, the power effect for the case selected remains practically constant, a relatively large displacement being permissible on both sides of a neutral line.

In the three springs of the pipe support, the vertically arranged pressure spring is located above both lateral springs. The drawbar is connected to a thrust block of the vertical spring and has a joint part adjustable on said vertical spring, the load being adjusted by adjustment of the joint part along the drawbar by loosening and retightening the clamp screws.

An object of the invention is to improve and simplify the sprung pipe support of the type aforementioned as regards its adjustability for the load provided. In the sprung pipe support, with three springs of equal dimensions in which the distance between the thrust block of the vertical spring and the joint is adjustable, the invention is characterized in that the vertical spring is arranged below the transverse pressure springs, and that the thrust block supporting the vertical spring is adjustable with respect to the casing. In this way the load setting can be effected simply, quickly and reliably. The setscrews for the thrust block of the vertical spring are located outside the casing, and are freely accessible from the outside. The fixing of the adjustment is independent of the clamp power of the clamp screws as in the known construction. The magnitude of the setting is easily observable. Thus checking is also facilitated. The setting can be made according to a scale, and need not be made from midposition.

According to a further feature of the invention, the drawbar is subdivided and comprises an adapter sleeve, or the like, connected to the joint and a lower part which can be engaged at different depths in this sleeve, this advantageously being effected by a threaded relation between the sleeve and lower portion. In this way the setting can be finely and delicately regulated.

The joint advantageously has a guidebolt projecting through a slot in the casing and a scale can be provided along this slot. In this way the setting of the joint or of the sprung pipe support can be seen and checked immediately.

Vertical movements in the pipe are generally caused by thermal expansion. A cold-load block is provided for water-pressure tests in the pipe. Here a bolt or the like, rigidly attached to the casing, is associated with the guidebolt, such that the guidebolt and stationary bolt are capable of being connected by a rigid member, for example a bar. In this way the direction of movement of the sprung pipe support is blocked and secured against movement on under- or overloading. Before the pipe is brought into use, this block is removed. It is thus possible to set the pipe weight accurately. The connection for the setting can then be undertaken by adjustment of the drawbar relative to the adapter sleeve or also by means of alternation of the thrust block supporting the vertical spring.

BRIEF DESCRIPTION OF THE DRAWING

FIG. 2 is a frontal diagrammatic view of the casing;
FIG. 3 is a side view;
and
FIG. 4 is a perspective view of the sprung pipe support.

DETAILED DESCRIPTION

Figure 1:
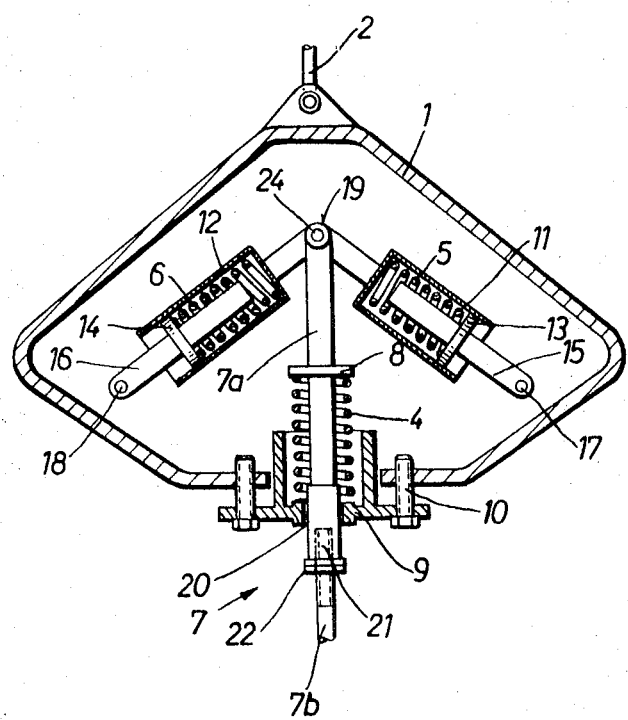
FIG. 1 shows the sprung pipe support according to the invention, in section in a diagrammatic frontal view, the forward casing wall being removed.

The sprung pipe support has a casing 1 suspended from a carrier bar 2. Three pressure springs 4, 5 and 6 are housed in casing 1, and interact with each other. A drawbar 7 adapted for carrying a pipe (not shown) engages the vertically arranged pressure spring 4. The drawbar has an upper thrust block 8 which is connected to said pressure spring 4, the spring also acting against a lower thrust block 9, which can be displaced and adjusted in an upward direction relative to casing 1 by means of setscrews 10. To this end, the setscrews 10 are screwed to a greater or lesser degree into the casing 1. Pressure springs 5 and 6, running transversely to the load direction, are located within spring sleeves 11 and 12 respectively and thrust blocks 13 and 14, which are rigidly connected to spring-guides 15 and 16, the spring guides being pivotably mounted around axles 17 and 18. The springs 4, 5 and 6 are all of equal size. Drawbar 7 and spring sleeves 11 and 12 are pivotably joined together by a common joint 19. The vertical pressure spring 4 is located below the common joint 19. Drawbar 7, on which the pipe is supported (by means of a shell or the like), is subdivided into an upper part 7a and a lower part 7b. The upper part 7a, carrying the rigid thrust block 8, has an adapter sleeve 20, into which the threaded end 21 of the lower part 7b of the drawbar can be screwed to a greater or lesser degree. The depth of insertion of the drawbar part 7b is secured to counternut 22.

The vertical spring 4 is tensioned to correspond to the weight of the pipe. Thus the movable thrust block 9 of the spring 4 is adjusted into casing 1 by turning the setscrews 10 in or out of the casing. The setting can be effected with reference to a scale 23 on casing 1. The joint 19 comprises a guidebolt 24, which is guided in a longitudinal slot 25 in the casing 1.

For water-pressure tests in the pipe, a cold-load block is suitably provided for the sprung pipe support. To this end a bolt 26 (FIG. 4), rigidly mounted on the casing 1, is associated with the guidebolt 24. The guidebolt 24 and the stationary bolt 26 can be rigidly connected by a bar 27. In this way the joint 19 is held stationary and movement of the sprung pipe support is blocked. Before the pipe is placed in use, the bar 27 is removed. If, when the cold-load block is removed, guidebolt 24 jams, then the theoretical setting does not correspond to the actual load. The setting can be corrected by rotation of the adapter sleeve 20. If the jamming of guidebolt 24 is not removed in this way, a new setting of the load should be undertaken by means of setscrews 10. It is possible to tack this opportunity of setting the pipe weight exactly. If the pipe weight is presumed to be too low, setscrews 10 should be turned out of the casing. The setscrews are secured in their fixed position by suitable screw fixtures.

I claim:
1. A sprung pipe support with support strength which remains substantially constant during vertical movements of the pipe weight, said support comprising a casing, a drawbar extending from within said casing for carrying the pipe weight, a vertically arranged pressure spring in said casing engaging said drawbar, two horizontally pivotable pressure springs coupled to said drawbar at a common joint and extending transversely to the load direction, all three springs having the same dimensions, said vertical spring being arranged below said common joint of the transverse pressure springs, a displaceable thrust block supporting the vertical spring, and means adjustably supporting the thrust block from the casing.

2. A pipe support as claimed in claim 1 wherein said drawbar comprises an adapter sleeve connected with said joint and a part adjustably engaged in said adapter sleeve.

3. A pipe support as claimed in claim 2 wherein said sleeve and part include threadably engaged portions.

4. A pipe support as claimed in claim 1 comprising a guidebolt on said joint, said casing having a slot in which said guide bolt is received, said casing having a scale along said slot.

5. A pipe support as claimed in claim 4 comprising a bolt rigidly mounted on said casing in association with said guide bolt so that the bolts are connectable by a rigid member.

6. A pipe support as claimed in claim 1 wherein said means adjustably supporting the thrust block from the casing comprises screw means threadably connected to said casing and engaging said thrust block.

7. A pipe support as claimed in claim 6 comprising a fixed thrust block on said drawbar secured to the vertically arranged pressure spring at the upper end thereof, the lower end of the latter spring bearing against the other thrust block.

8. A pipe support as claimed in claim 7, said drawbar comprising an adapter sleeve coupled with said joint and extending through said displaceable thrust block, and a part adjustably engaged in said adapter sleeve and accessible externally of the casing, said vertically arranged pressure spring surrounding said drawbar.

9. A pipe support as claimed in claim 1 wherein said means comprises threaded members joining said thrust block to said casing for vertical adjustment coaxial with said vertically arranged pressure spring.